United States Patent
Pearce

[11] Patent Number: 5,421,874
[45] Date of Patent: Jun. 6, 1995

[54] COMPOSITE MICROSPHERE AND LUBRICANT MIXTURE

[75] Inventor: Tony M. Pearce, Alpine, Utah

[73] Assignee: Genesis Composites, L.C., Salt Lake City, Utah

[21] Appl. No.: 81,467

[22] Filed: Jun. 22, 1993

[51] Int. Cl.$^6$ ............................ C09D 5/00; C09D 5/34
[52] U.S. Cl. ...................................... 106/122; 501/32
[58] Field of Search ......................... 501/32; 106/122

[56] References Cited

U.S. PATENT DOCUMENTS

| | | | |
|---|---|---|---|
| 3,407,406 | 10/1968 | Werner | 36/76 |
| 3,529,368 | 9/1970 | Canfield | 36/2.5 |
| 3,552,044 | 1/1971 | Wiele | 36/71 |
| 4,083,127 | 4/1978 | Hanson | 36/93 |
| 4,252,910 | 2/1981 | Schaefer | 521/145 |
| 4,467,053 | 8/1984 | Markle | 521/128 |
| 4,728,551 | 3/1988 | Jay | 428/76 |

*Primary Examiner*—David Brunsman
*Attorney, Agent, or Firm*—Daniel P. McCarthy

[57] ABSTRACT

A composite mixture of spherical objects and lubricant useful for its cushioning properties is disclosed and claimed. The composite mixture may be composed of microspheres typically less than 2000 microns in diameter with inert atmospheres sealed within their interiors and any of a variety of lubricants facilitating sliding and rolling movement between microspheres. Typically the composite mixture includes lubricant in a quantity sufficient to substantially coat the exterior surface of essentially all of the spherical objects, but in a quantity less than would cause dispersion of the spherical objects in the lubricant sufficient to physically separate the spherical objects from each other and substantially reduce the sliding and rolling contact of the spherical objects with each other. A low specific gravity, low thermal mass, low coefficient of heat transfer, insulative and flotation qualities are provided by the invention. The composite mixture may be contained in fluid-tight confinement within a flexible bladder.

17 Claims, 2 Drawing Sheets

COMPOSITE MICROSPHERE AND LUBRICANT MIXTURE

I. BACKGROUND OF THE INVENTION

A. Field of the Invention

This invention relates to the field of lightweight flowable and shearable materials including materials for cushions and padding, such as seat cushions or bed pads, where skin comfort and skin preservation are important. More particularly, this invention relates to a composite mixture of a lubricant and hollow spherical objects which may be encased within a flexible container or sack and used as a cushion or padding. The exterior surfaces of the spherical objects are lightly lubricated to accommodate flow and shear, but lubricant is not used in an amount sufficient to cause dispersion of the spherical objects in the lubricant. Additionally, the mixture has no memory which would cause it to move, flow or change shape absent a deforming force. The composite mixture has a very low specific gravity, making it an excellent flotation material.

B. The Background Art

In the prior art there has been substantial difficulty in designing padding or cushions for contact with a patient's skin which equalize pressure across the entire area of skin contacted, are flowable, have a low shearing force threshold, have no memory, are lightweight, do not substantially vary in performance with temperature, do not break down or separate into their constituent components over time, do not feel overly cold to the touch, and quickly warm to body temperature. The prior art has also been unable to design a flotation material which has a low specific gravity for buoyancy but was not stiff or semi-rigid and therefore somewhat uncomfortable for the wearer of a life vest containing such material.

For example, the typical prior art wheelchair seat consists of a fabric sling draped between two metal bars in which the patient sits. Frequently the sling has a plastic or rubber coating for durability. Sling seats such as this are unable to conform to the shape of the human body, resulting in greater force being applied to some portions of the patient's anatomy than to others. Over time, high spots or bony areas on the patient's body often develop abrasions, sores or callouses as a result. Sling seats typically also have a high shearing force threshold, being resistent to movement or turning in response to movement by the patient. As the patient turns or moves within the seat, friction with the patient's body would tend to move the portion of the seat in direct contact with the patient's body. All portions of the typical prior art seat, however, are typically held fast together, whether by monolithic construction, such as in foam seats, with stitching as in sling seats, or otherwise. The high resulting shearing force threshold causes small tears or abrasions on the patient's skin during turning or movement. Skin damage from shear-resistant seats can be cumulative and debilitating over time. Other traditional types of cushions and padding have provided little relief from the disadvantages of sling seats. For example, patients confined to bed typically experience the same skin damage as those using a sling seat even though mattresses usually include a combination of metal springs, foam padding and cotton or synthetic batting.

The best prior art solution to the problems of typical cushions and padding has been gels or viscous and slimy liquids (hereinafter "gels") contained within a flexible bag or bladder. The use of gels within a flexible bladder for contact with a patient's body achieves much more uniform force or pressure on irregular body surfaces than traditional prior art cushions and padding. The shearing force threshold of gel within a bladder may be lower than in other prior art cushions or pads because the bladder surface closest to the patient's body is free, within certain limits, to move with the patient's body as the patient moves. The bladder walls are not anchored to the gel so that as the patient moves, the bladder may move with respect to the gel. The gel also has some ability to shear with respect to itself. The result is a seat which is less damaging to human skin than a typical sling seat. Unfortunately, most prior art gels are very slow to respond to body movement, giving an undesirably high shearing force during quick body movement and failing to fully preserve the integrity of the patient's skin. Gel within a bladder is currently used as padding in some wheelchair and bicycle seats. Prior art gels are also very heavy, even when hollow microbeads are dispersed in the gel. Further, prior gels have memory, causing them to exert a constant force on bony protruberences of the body, causing skin damage and discomfort.

Gel has the disadvantage of being much heavier than the flexible foam used in typical cushions. Gels commonly used in cushioning have specific gravities of 0.8 to 1.2, whereas a typical cushion foam may have a specific gravity of only 0.05 to 0.10. Thus, in order to achieve a lightweight seat, gel must be used sparingly. When gel is used sparingly, its positive characteristics are minimized. Alternatively, gel may be used in combination with flexible foam. This is an undesirable compromise because much of the irregular pressure distribution sought to be avoided by using a gel is reintroduced. Use of gels in sufficient quantity to achieve the desired effect results in a seat weight unacceptable for many applications. For example, patients using wheelchairs commonly suffer from a weakened physical condition, and an increase in the weight of a wheelchair by only a few pounds can make it excessively burdensome for the patient to use. As another example, total bicycle weight is typically a primary consideration in the design of both road bikes and mountain bikes. The additional weight of a gel seat is often unacceptable to all but the most casual of riders.

Another disadvantage of prior art gels is that they have a high thermal mass and a high coefficient of heat transfer. As a result, gel seats typically feel cold to the touch, providing initial discomfort to the user and remain cold for long periods of time before warming. Gels used in prior art cushioning also exhibit substantial viscosity change with temperature, causing them to become more viscous and lose their functional characteristics in cold temperatures. Similarly, in very warm temperatures, prior art gels will exhibit excessive flow characteristics and again not function as desired. Finally, prior art gels used in cushioning will tend to break down and separate into their constituent components over time, causing a loss of functional characteristics. The user of a gel cushion must therefore periodically knead the cushion to re-mix the components of the gel and keep it functioning. Kneading a gel cushion can be difficult or impossible for many wheelchair users because of the hand strength required, making a gel cushion very undesirable.

Prior art U.S. Patents to Terrence M. Drew et al. issued Mar. 3, 1992, (No. 5,093,138), and Mar. 31, 1992, (No. 5,100,712), describe a flowable, pressure compensating composition including water, a material for increasing the viscosity of water, and spherical particles dispersed throughout the volume of the water. Both of these patents are hereby incorporated by reference in their entirety. The composition disclosed in these patents is a deformable gel which has the disadvantages of substantial weight, memory, and being slow to flow or shear in response to a deforming pressure, thus being prone to cause skin damage.

Prior art U.S. Patents to Chris A. Hanson issued Oct. 22, 1991, (No. 5,058,291) and Aug. 28, 1990, (No. 4,952,439), describe padding devices which are resistant to flow in response to an instantly applied pressure. These two patents are hereby incorporated by reference in their entirety. The padding disclosed in these patents has the disadvantage of being slow to flow in response to pressure, thus having a high shearing force and being prone to cause skin damage. The materials disclosed in these patents also have memory, causing them to tend to return to their original shape after removal of a deforming pressure. The memory of the material causes the material to exert additional pressure on protruberences of the body, such as on bony areas, increasing the risk of skin abrasions and sores. Typically, material having memory has a high shear force as well, increasing skin damage during use. Memory is described in U.S. Patents to Chris A. Hanson issued Sep. 15, 1992, (No. 5,147,685), Terrence M. Drew issued Apr. 20, 1993, (No. 5,204,154), Chris A. Hanson issued Aug. 28, 1990, (No. 4,952,439), Terrence M. Drew et al. issued Mar. 3, 1992, (No. 5,093,138), Chris A. Hanson issued Oct. 22, 1991, (No. 5,058,291), and Terrence M. Drew, et al. issued Mar. 31, 1992, (No. 5,100,712), each of which is incorporated by reference in its entirety.

Prior art U.S. Patents to Eric C. Jay issued Mar. 1, 1988, (No. 4,728,551), Jack C. Swan, Jr. issued Jan. 6, 1981, (No. 4,243,754), Jack C. Swan, Jr. issued Jan. 6, 1981, (No. 4,229,546), Jack C. Swan, Jr. issued Jan. 6, 1981, (No. 4,255,202), Jack C. Swan, Jr. issued Jan. 6, 1981, (No. 4,144,658), Jack C. Swan, Jr. issued Jan. 6, 1981, (No. 4,038,762), Reginald Dyson issued Jul. 13, 1976, (No. 3,398,530), Henry Wilfred Lynch issued Oct. 19, 1976, (No. 3,398,213) and Frederick L. Warner issued Jul. 31, 1973, (No. 3,748,669), each of which is hereby incorporated by reference in its entirety, disclose pressure compensating mixtures which are generally characterized by having a quantity of microbeads dispersed in a flowable liquid medium. Disadvantages of such mixtures include their weight and memory. The liquid described in those prior art patents is formulated for certain flow characteristics and the microbeads are merely added because of their low specific gravity to reduce the total weight of the mixture. The resulting mixture is still very heavy because the light microbeads are not used to replace a substantial amount of the heavy liquid, but are instead used only to provide a slight weight reduction of the mixture compared to the use of a liquid alone.

Background information related to the invention is described in U.S. Patents to Terrence M. Drew issued Apr. 20, 1993, (No. 5,204,154), John C. Dinsmoor issued Apr. 13, 1993, (No. 5,201,780), Chris A. Hanson issued Sep. 15, 1992, (No. 5,147,685), Adrian Q. RoJas issued Jan. 14, 1992, (No. 5,079,786), Huibert P. M. Pollmann issued Jan. 14, 1992, (No. 5,079,787), Eric C. Jay issued May 28, 1991, (No. 5,018,790), Terrence M. Drew et al. issued May 14, 1991, (No. 5,015,313), Eric C. Jay issued Jun. 27, 1989, (No. 4,842,330), Eric C. Jay issued Aug. 9, 1988, (No. 4,761,843), Eric C. Jay issued Feb. 23, 1988, (No. 4,726,624), Donald H. Shaktman issued Dec. 1, 1987, (No. 4,709,431), Eric C. Jay issued Apr. 28, 1987, (No. 4,660,238), and Eric C. Jay issued May 13, 1986, (No. 4,588,229), each of which is hereby incorporated by reference in its entirety.

Prior art flotation devices, such as life vests, typically included a flotation material such as foam with small air bubbles throughout its interior. While such flotation material typically had a low specific gravity, it was typically semi-rigid or stiff and was uncomfortable to wear. The stiffness of the prior art flotation material caused prior art flotation devices such as life vests to restrict body movement of the wearer and result in discomfort. When a flotation device is made using the invented composite mixture, flotation qualities equal or superior to the flotation qualities of prior art flotation material is provided, but the deformable, flowable and shearable nature of the composite mixture permits it to respond to movement of body parts quickly and with little resistance resulting in a flotation device which does not restrict movement or activity. The composite mixture of the present invention has a further advantage as a flotation material because it may be inserted into containers of irregular shape and provide the containers with flotation characteristics. No forming of the composite mixture would be required as with prior art foam flotation materials.

II. SUMMARY OF THE INVENTION

The prior art difficulty in providing a lightweight, deformable, flowable and shearable material with no memory for use in padding or cushions or otherwise for contact with a patient's skin or for use in flotation devices is provided by a composite mixture of spherical objects lightly lubricated but with a quantity of lubricant insufficient to disperse microspheres in the lubricant. The composite mixture can be used in cushions or padding to equalize pressure across the entire area of skin contacted. In the preferred embodiment, the composite mixture has a low shearing force threshold, is lightweight, does not substantially vary in performance characteristics with temperature, does not feel cold to the touch and warms to body temperature quickly. When hollow spherical objects or spherical objects with gaseous interiors are used, the composite mixture takes on insulative qualities as well. The composite mixture of the invention may be encased within a flexible bladder or container and used as a cushion or padding.

It is an object of the invention to provide a cushion which distributes pressure across the contact area of the cushioned object as equally as possible. The invention achieves this objective by providing a cushion which readily flows by virtue of a pliable container which contains a composite mixture that exhibits low viscosity under deforming pressures, thereby conforming without memory to the irregular contour surfaces of the object being cushioned to provide substantially equal supporting force across the entire area supported.

It is an object of the invention to provide a cushion which has a low shearing force threshold when rapidly sheared. The invention achieves this objective by utilizing a flexible bladder as container for the composite mixture and a composite mixture which is quick to flow, deform, shear and respond to body movement by having low viscosity under deforming pressures but ceasing to flow when pressure is removed, thereby having little or no memory. As the object being cushioned moves with respect to the cushion, the bladder wall nearest the cushioned object is free to move with the cushioned object, within certain limits, and the composite mixture offers little resistance to internal flow and shearing. The bladder walls are typically not anchored to each other except for sealing, and the composite mixture does little to inhibit movement of the bladder wall, instead moving with the cushioned body in response to body movement. In this way, shearing force threshold is minimized when the invention is used as compared with the viscous cushioning gels of the prior art.

It is an object of the invention to provide a cushion which is lightweight. The preferred composite mixture uses hollow spheres and an amount of lubricant sufficient to lightly coat the exterior surfaces of the spheres but inadequate to cause any dispersion of the spheres in the lubricant. The hollow spheres have a very low specific gravity due to the fact that they are essentially a spherical shell with an interior void or interior gaseous atmosphere comprising most of their volume. When used in conjunction with a modest amount of lubricant that has a low to moderate specific gravity and with a lightweight bladder material, the invention provides a very lightweight cushion or flotation device compared to gel cushions available in the prior art.

It is an object of the invention to provide a cushion which does not feel overly cold to the touch and which quickly warms to body temperature. The composite mixture employed in the preferred embodiment of the invention has a low thermal mass and a low coefficient of heat transfer compared to prior art cushioning gels because of the insulative properties of the hollow spheres. In alternative embodiments of the invention, a bladder with insulating qualities is employed as well. Thus, the invention can provide a cushion which substantially reduces the prior art problem of being cold to the touch. Alternatively, the invention could be used in wet suits for both its insulative and flotation properties.

It is an object of the invention to provide a cushion which has performance characteristics that do not vary substantially with temperature. The spherical objects used in the composite mixture of the invention exhibit no change or an undetectable change in performance with variations in temperature in a seat cushion. In the preferred embodiment of the invention, lubricant is used which has low variation in lubriciousness in the range of temperatures to which seat cushions are normally subject. In prior art gels, the fluid characteristics (such as viscosity) dictate the flowability and shearability of the gel, resulting in changes in performance with temperature due at least in part to changes in viscosity. In contrast, the present invention depends only on the lubriciousness or slipperiness of the fluid used to lubricate the spherical objects of the invention. Because lubriciousness is not overly affected by viscosity changes, the flowability and shearability of the composite mixture of the present invention is not substantially affected by changes in temperature. Thus, invention does not substantially suffer from variation in performance characteristics over a range of temperatures.

It is an object of the invention to provide a cushion that does not break down or separate into its constituent parts over time. The spherical objects used in the preferred embodiment of the invention are stable, resistant to wear or breakage, and maintain their shape and structural integrity over very long periods of time, far in excess of the life of a prior art cushion. The lubricant employed in the preferred embodiment of the invention does not separate into its constituent components during use as prior art gels do. Thus, the composite mixture of the invention will endure over time without degradation typical of prior art gels and foam.

III. BRIEF DESCRIPTION OF THE DRAWINGS

IV. DESCRIPTION OF THE PREFERRED EMBODIMENTS

Figure 1:
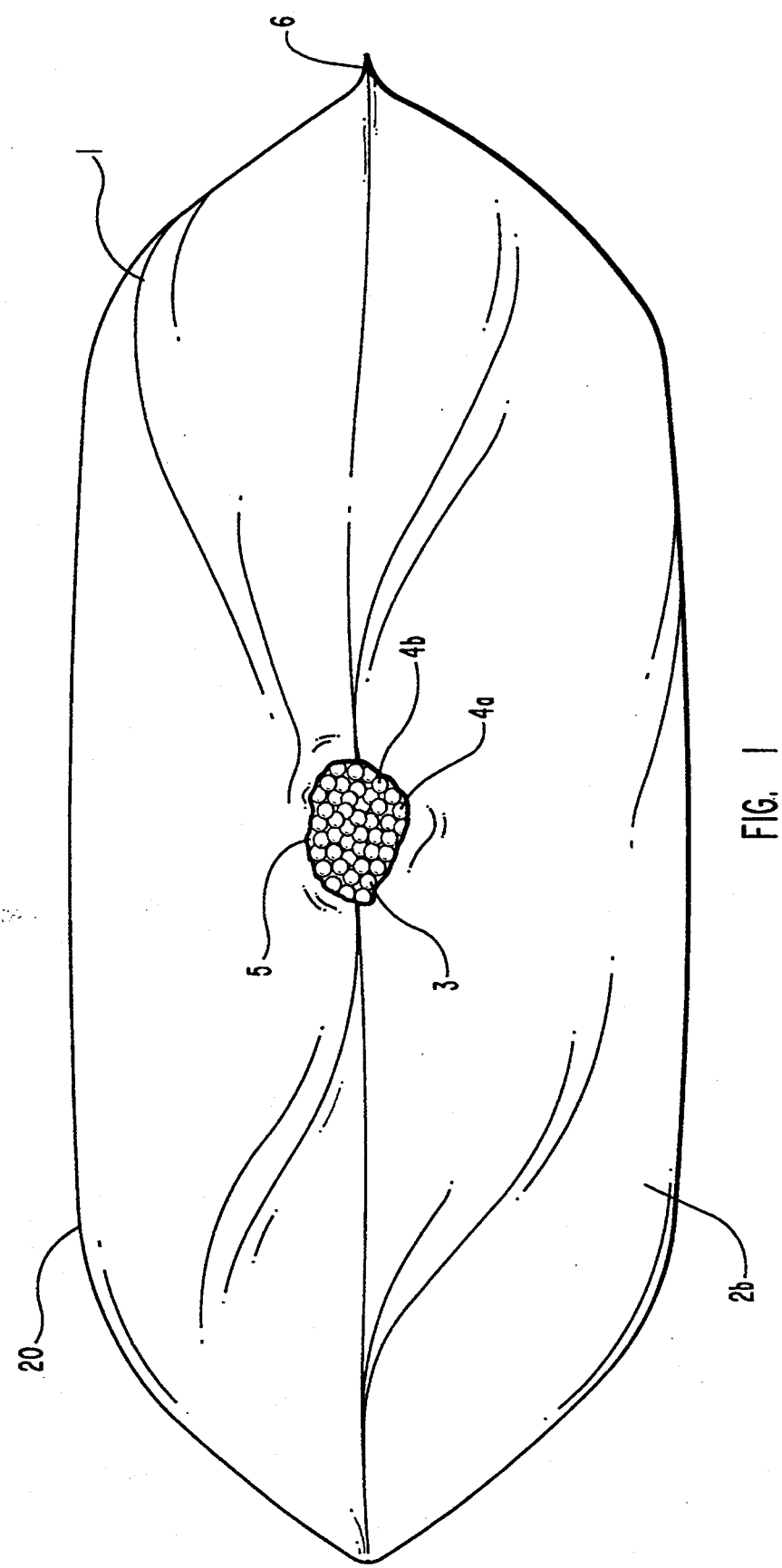
FIG. 1 depicts a preferred embodiment of the composite mixture of the invention employed within a flexible bladder.

Referring to FIG. 1, one preferred embodiment of the composite mixture of the invention within a flexible bladder 1 is shown. The flexible bladder 1 comprises bladder walls 2a and 2b and serves as a means for containing the composite mixture of the invention in flexible fluid-tight confinement. The bladder may have a seam 6 where it was sealed. Although the bladder walls 2a and 2b are flexible in the preferred embodiment, filling the bladder 1 to capacity with composite mixture would greatly reduce or eliminate possible movement of the bladder walls 2a and 2b and inhibit the cushioning effect of the invention.

In the center of the bladder 1 is shown a cut-away depicting the composite mixture 3 of the invention. The composite mixture 3 in the preferred embodiment of the invention is composed of numerous spherical objects 4a and 4b able, by rolling and sliding, to move with respect to each other with lubricant 5 therebetween to facilitate such movement. The amount of lubricant 5 used in the invention is a quantity sufficient to substantially coat the exterior surfaces of substantially all of the spherical objects 4a–c, but in a quantity less than would cause dispersion of the spherical objects 4a–c in lubricant 5 sufficient to significantly physically separate the spherical objects 4a–c from each other. The behavior of spherical objects 4a and 4b is similar to that of oiled ball bearings in sliding and rolling contact with each other, providing little resistance to movement in any direction. This permits the composite mixture to deform in response to a deforming force, including any flowing or shearing movement of the composite mixture. Because the mixture is composed of lightly lubricated spherical objects (i.e. discrete solid particles) rather than being composed of a viscous liquid like prior art gels, the composite mixture does not return to its original shape after the removal of a deforming force, having no memory.

Figure 2:
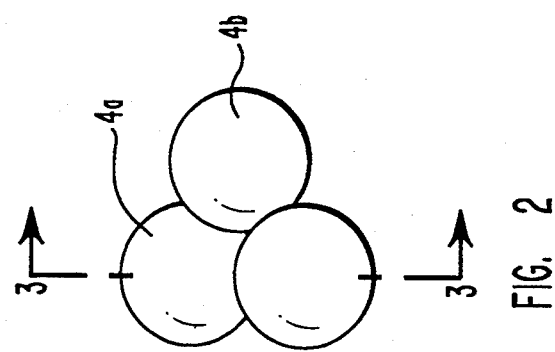
FIG. 2 depicts three spherical objects of the invention in rolling and sliding contact with each other.

FIG. 2 depicts three spherical objects 4a, 4b and 4c in sliding and rolling contact with each other. Use of perfect or nearly perfect spheres facilitates the most efficient and lowest friction movement of the spherical objects against each other, but imperfect shapes or even objects with flat or rough sides could be used. Any of the spherical objects 4a, 4b or 4c can easily roll and slide with respect to the other spherical objects as shown.

Figure 3:
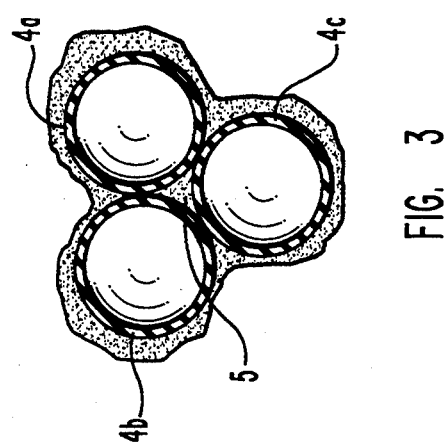
FIG. 3 depicts a cross-sectional view at A—A of three spherical objects of the invention in rolling and sliding lubricated contact with each other.

FIG. 3 depicts a cross-sectional view of the spherical objects of FIG. 2 in rolling and sliding lubricated contact with each other. In the preferred embodiment depicted in FIG. 3, hollow spherical objects 4a, 4b and 4c are utilized and a lubricant 5 is present on the exterior surfaces of the spherical objects to further facilitate their movement relative to each other. The combination of low-friction spherical objects 4a, 4b, and 4c with a high quality lubricant 5 facilitates very efficient movement of the spherical objects, offering little resistance to movement in any direction and achieving the desired flow and shear characteristics of the invention. The movement may be either from rolling or sliding of the spherical objects 4a, 4b and 4c with respect to each other.

Figure 4:
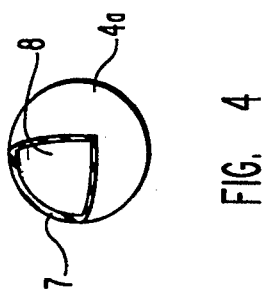
FIG. 4 depicts a partial section of a hollow spherical object used in one preferred embodiment of the invention.

FIG. 4 depicts a partial section of a spherical object 4a used in one preferred embodiment of the invention. Shown are the spherical object rigid outer shell 7 and spherical object interior 8. The spherical object 4a has an interior 8 that may be hollow or may contain a gaseous interior. In alternative embodiments of the invention, spherical objects which have liquid interiors are used. The preferred embodiment of the invention utilizes spherical objects 3 with an inert gaseous atmosphere in their interiors 8. If a shell 7 of low density is used, the combination of shell 7 and hollow or gaseous interior 8 results in a spherical object 4a with a very low specific gravity.

The spherical objects 4a and 4b may be entirely spherical, oblong, egg-shaped, spherical with a flat spot, multi-sided such as octagonal, rough-sided or otherwise. Nearly perfect spherical shapes with smooth exteriors are preferred, although the ones mentioned above or others could be used as substitutes and are all collectively referred to herein as "spherical objects." As mentioned above, the spherical objects may be hollow, solid, or may have gaseous or liquid interiors, although gaseous interiors are used in the preferred embodiment. The density of the spherical objects used in most preferred embodiments of the invention is no more than 10% the density of water and in some preferred embodiments it is less than 2% that of water. In other embodiments of the invention, partially hollow interiors, such as a lattice interior or others, may be used, typically resulting in a greater specific gravity.

The spherical objects used in the preferred embodiment of the invention are microspheres which are commonly available commercially, with walls made of metal, glass, carbon, mineral, quartz, and plastic and having inert gaseous atmospheres sealed within their interiors. Microspheres of other materials would be suitable for use in the invention as well. The interior of the microspheres often could be entirely hollow (i.e. having an interior vacuum) or could have gaseous or liquid interiors. The microspheres typically have diameters less than 2000 microns. A common range of commercially available microsphere diameters is 5 to 200 microns. A typical range of commercially available microsphere diameters is 10 to 70 microns. Microspheres of other sizes could be used as well. For example, spherical objects of larger dimensions, such as 0.25 inches in diameter, could be employed, although the cushioning surface provided by such spherical objects would be bumpy rather than smooth. The microspheres used in the preferred embodiment of the invention are very small, as indicated above, and appear as fine dust to the naked eye, there being thousands of such microspheres per cubic inch. When lightly lubricated, the resultant composite mixture appears homogeneous.

The lubricant 5 used in the invention may be any lubricant selected from the group consisting of oils, greases, silicone-based lubricants, vegetable-based lubricants, petroleum-based lubricants, mineral-based lubricants, water-based lubricants, synthetic lubricants, or any other friction reducing substance. In the preferred embodiment of the invention, the lubricant is a soap and water or detergent and water mixture. One mixture used in the preferred embodiment is a bubble-blowing solution known as MR. BUBBLES, available from Tootsietoy, a division of Strombecker Corporation of Chicago, Ill. Many different soap or detergent and water compositions could be used as well, with a preference for more lubricous (slippery) mixtures. In another preferred embodiment of the invention, SUPREPULL WIRE AND CABLE PULLING LUBE WITH TEFLON available from Synco Chemical Corporation of Bohemia, N.Y. is used. This is a water based, non-toxic, odorless and non-flammable lubricant. In another preferred embodiment of the invention, a lubricant comprising deionized water, propylene glycol, isopropanol, polyethylene oxide, and methylparaben is used. PERMATEX INDUSTRIAL SUPER LUBE MULTIPURPOSE SYNTHETIC LUBRICANT WITH TEFLON which is commercially available from Permatex Industrial Corporation of Avon, Conn. may also be used. It is desirable for the lubricant to resist changes in lubriciousness with changes in temperature to which cushions are commonly exposed, namely 0 degrees to 120 degrees Fahrenheit. This avoids substantial variance in essential performance characteristics of the composite mixture with changes in temperature. Therefore, any number of commercial antifreezes could be added to the lubricant of the composite mixture.

The object of the lubricant is to facilitate low friction sliding and rolling contact of microspheres with each other to permit flow and shear of the composite mixture. It is not an object of the lubricant to disperse the microspheres in lubricant and prevent contact of microspheres with each other. The quantity of lubricant required for such dispersion would make the composite mixture unduly heavy and would increase its coefficient of heat transfer and thermal mass due to the reduction of the amount of trapped gases in the form of microsphere interiors. Such a large amount of lubricant would also result in a composite mixture with memory and with a greater shear force than desired in the present invention. Therefore the amount of lubricant used in the invention is a quantity sufficient to substantially coat the exterior surfaces of substantially all of the spherical objects, but in a quantity less than would cause dispersion of the spherical objects in the lubricant sufficient to significantly physically separate the spherical objects from each other. The spherical objects would be considered significantly physically separated if the amount of lubricant provided allowed the spherical objects to float in the lubricant independent of each other rather than, as in the invention, continually being in sliding and rolling contact with each other with only a thin film of lubricant interposed between the spherical objects to facilitate their sliding and rolling contact.

The composite mixture of the invention deforms, flows or shears under light pressure but ceases to flow, shear or deform when the pressure is terminated. Prior art gels typically continue to flow after pressure has been terminated, often in an attempt to rebound to their original shape, exhibiting at least some memory and being inferior in performance to the composite mixture of the present invention. Lubricants which impede rather than facilitate sliding and rolling movement of spherical objects with each other, such as stiff wax, would be undesirable because they would not achieve the objects of the invention. The lubricant need only serve to reduce the coefficient of friction of the spherical objects sliding and rolling with respect to each other.

The best mode of the invention consists of any highly lubricous lubricant. Such a lubricant could be a synthetic lubricant, may be USDA food grade, non-flammable or contain some fire retardant additives. Viscosity of the lubricant is relatively unimportant, with excellent results having been obtained with very light oils to heavy greases, as long as the lubricant is not so stiff that it serves to impede sliding and rolling movement of spherical objects with respect to each other. Preferably, the lubricant used will not be subject to substantial changes in lubriciousness in the range of ordinary outdoor temperatures (0 degrees to +120 degrees Fahrenheit). Many oil-based and water-based lubricants exhibit this resistance to lubriciousness change. If possible, the lubricant used should have a low specific gravity and not be subject to degradation or break down over time. This helps the invention achieve its objects of being lightweight, durable, and not varying in performance with temperature. In the preferred embodiment, the composite mixture shears more easily than and equalizes pressure as well as prior art cushioning gels but weighs only 20% to 50% as much.

In the preferred embodiment the spherical objects used are plastic-walled microspheres in the 10–200 micron diameter range. These microspheres may be obtained from P.Q. Corporation of Valley Forge, Pa. The particular composite mixture which the inventor contemplates as a best mode is a mixture of lubricant and microscopic spherical objects resulting in a specific gravity for the composite mixture of about 0.2 to 0.25 or less. Various other preferred embodiments of the invention have higher specific gravities, some being up to and above 0.50 and some being less than 0.2. Achieving a low shear force relies on achieving a low coefficient of friction between the spherical objects such as by using a highly lubricous lubricant and spherical objects with very smooth exteriors. In practice, nearly any lubricant can be used and any type of spherical object can be used, made of almost any material, hollow or otherwise and of nearly any size.

In the preferred embodiment of the invention, preparation of the composite mixture is performed simply by placing the lubricant and spherical objects in a container and mixing until the spheres are uniformly coated with lubricant. No special preparation steps are required, and the ingredients can be mixed at ambient temperature.

The flexible bladder used in the preferred embodiment of the invention is polyurethane film material that is 0.003 to 0.010 inches in thickness, and in most embodiments, the film is less than 0.020 in thickness. In other embodiments of the invention, any flexible or pliable fluid-tight material in a variety of thicknesses would be appropriate for a bladder. The bladder may be filled with composite mixture by removing air from the bladder and injecting the composite mixture, thereby preventing any gross air bubbles from being present in the bladder. The bladder should only be partially filled with composite mixture to permit movement of the mixture and to achieve the desired cushioning properties. The volume of composite mixture in the bladder may be increased to provide a stiffer cushion or decreased to provide a more flowable cushion as per physician and physical therapist recommendations for a particular patient. It would be contrary to the objects of the invention to fill the bladder more than 80% full with composite mixture because the flow and shear characteristics of the composite mixture would be impaired. Also, no gross air bubbles should be included in the finished product or the performance of the device will be reduced. On average, bladders are expected to be about half filled with composite mixture by volume. In most embodiments of the invention, not more than 80% of the maximum volume of the bladder is filled with composite mixture, although completely full or nearly empty bladders could be envisioned. In some embodiments of the invention, cushions may be constructed which include multiple compartment bladders or a plurality of individual bladders. For example, a mattress pad would typically include numerous small individual bladders, while an automobile seat could be constructed either with numerous small individual bladders, from one large bladder or from one compartmentalized bladder having multiple compartments.

The composite mixture of the invention is a material which has many of the same beneficial physical properties as gels used in cushioning, but absent the numerous disadvantages of gels. For example, the composite mixture has a low specific gravity and hence is lightweight, has little or no memory, has a low shearing force threshold, and a low thermal mass and low coefficient of heat transfer, little to no variation in performance over broad temperature ranges, resistance to degradation over time, the mixture relatively evenly distributes pressure over the contact surface area of any object being cushioned, and the mixture has a specific gravity low enough to make it useful for use in flotation devices. The composite mixture is not gel as found in the prior art, however, consisting instead of large numbers of microscopic lubricated rigid spheres rolling and sliding with respect to one another. The lubricant is used to reduce the coefficient of friction of the outside surface of the spherical objects (i.e., make them slick), allowing desired sliding and rolling movement between spherical objects but does not serve as a dispersing liquid for the spherical objects. Because lubricants are available that do not break down over time, and because microspheres are available that are chemically inert (e.g., glass microspheres), a composite mixture can be made such that it lasts indefinitely without change in properties. The composite mixture of the invention has a lower coefficient of heat transfer than prior art cushioning gels because the interior of the microspheres used in the preferred embodiment have trapped gaseous internal atmospheres, and trapped gas acts as an excellent insulator. As a result, the composite mixture of the invention does not feel as cold to the body that is being cushioned as do cushions using prior art gels. A low coefficient of heat transfer, such as less than 0.25 btu per hour per foot per degree Fahrenheit is provided in the preferred embodiment of the invention. A low coefficient of thermal of thermal mass, less than 0.7 calories per cubic centimeter per degree Celsius, is also provided by the preferred embodiment of the invention.

A very important advantage of the invention is that it provides substantially even distribution of pressure across the contact area of the object being cushioned. This is because the use of the composite mixture within a partially-filled flexible bladder permits the composite mixture to accommodate object protrusions and flow and fill object depressions. As the composite mixture flows to contact as much area of the object as possible, pressure across the contact area of the object is equalized.

Cushions can be made with the invented composite mixture for any number of applications, including wheelchair seats, wheelchair backs, bicycle seats, bicycle gloves, bicycle handlebar grips, walking shoes, athletic shoes, work boots, automobile seats, stadium seats, saddles, secretarial chairs, executive chairs, lounge chairs, lumbar supports, and others. Other applications for the invented material include mattress tops for conventional mattresses, fill material for waterbed-type mattresses, and cushioning pads for hospital beds. The invented composite mixture can be used in applications where insulative qualities are desired, such as the aforementioned stadium seats. The invented composite mixture can also be used in applications where a particular consistency, response or feel is to be achieved, i.e., to fill sports balls, balls for recreational ball jumpy pits (such as are in some McDonalds play areas), lifelike mannequins, and any time fluid flow characteristics are desired. The fluid flow characteristics provided by the invention include flowability under deforming pressure and cessation of flow when the pressure is removed (no memory) as well as shearability. Finally, the invented composition can be used in flotation devices due to its low specific gravity and the comfort and ease of body movement that it provides the wearer.

While the present invention has been described and illustrated in conjunction with a number of specific embodiments, those skilled in the art will appreciate that variations and modifications may be made without departing from the principles of the invention as herein illustrated, described and claimed. The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A composite mixture comprising:
   spherical objects and
   means for lubricating said spherical objects for low-friction sliding and rolling contact with each other;
   wherein said spherical objects and said lubricating means are mixed together to form the composite mixture;
   wherein said lubricating means is present on the exterior surface of essentially all of said spherical objects, but in a quantity less than would cause dispersion of said spherical objects in said lubricating means sufficient to significantly physically separate said spherical objects from each other and thereby reduce the sliding and rolling contact of said spherical objects with each other;
   wherein said lubricating means is lubricous, serves to reduce the coefficient of friction between contacting spherical objects, and does not prevent sliding and rolling of said spherical objects with respect to each other;
   wherein said spherical objects within said mixture are movable in low-friction sliding and rolling contact with each other in all three dimensions;
   wherein said lubricating means comprises an element selected from the group consisting of soap and detergent;
   wherein the composite mixture flows and shears in response to a deforming pressure exerted on it, said flow and shear being accomplished by said spherical objects moving in rolling and sliding contact with each other; and
   wherein the composite mixture ceases to flow and shear when the deforming pressure is terminated.

2. A composite mixture as recited in claim 1 wherein at least one of said spherical objects comprises an inert gaseous interior.

3. A composite mixture as recited in claim 2 wherein the rigid outer shells of said spherical objects are made from material selected from the group consisting of plastic, glass, metal, carbon, mineral, and quartz.

4. A composite mixture as recited in claim 1 wherein said spherical objects are less than 2000 microns in diameter.

5. A composite mixture as recited in claim 1 wherein said spherical objects are of diameters ranging from 5 to 200 microns.

6. A composite mixture as recited in claim 1 wherein said spherical objects are of diameters ranging from 10 to 70 microns.

7. A composite mixture as recited in claim 6 wherein said composite mixture flows and shears under light pressure and ceases to flow and shear when pressure is removed.

8. A composite mixture as recited in claim 6 wherein said composite mixture maintains its essential performance with temperatures in the temperature range of 0 degrees to 120 degrees Fahrenheit.

9. A composite mixture as recited in claim 1 wherein said spherical objects comprise a rigid outer shell and a gaseous interior.

10. A composite mixture as recited in claim 9 wherein said lubricant maintains lubricousness with changes in temperature.

11. A composite mixture as recited in claim 9 wherein said composite mixture resists breaking down over time.

12. A composite mixture as recited in claim 1 wherein said lubricating means further comprises a lubricant selected from the group consisting of water-based, petroleum-based, silicone-based, vegetable-based, and mineral-based lubricants.

13. A composite mixture as recited in claim 1 wherein said composite mixture has a thermal mass less than 0.7 calories per cubic centimeter per degree Celsius.

14. A composite mixture as recited in claim 1 wherein said composite mixture has a coefficient of heat transfer less than 0.25 btu per hour per foot per degree Fahrenheit.

15. A composite mixture as recited in claim 1 further comprising antifreeze.

16. A composite mixture comprising:
    spherical objects comprising an outer shell and an inert atmosphere sealed within the outer shell, said spherical objects being less than 2000 microns in diameter, and means for lubricating said spherical objects;

wherein said lubricating means comprises an element selected from the group consisting of soap and detergent;

wherein said lubricating means is lubricous, serves to reduce the coefficient of friction between contacting spherical objects, and does not prevent sliding and rolling of said spherical with respect to each other;

wherein said lubricating means is present on the exterior surface of essentially all of said spherical objects, but in a quantity less than would cause dispersion of said spherical objects in said lubricating means sufficient to significantly physically separate said spherical objects from each other such that more than a thin film of lubricant is interposed between spherical objects and preventing the sliding and rolling contact of said spherical objects with each other;

wherein said spherical objects and said lubricating means are mixed together to form the composite mixture;

wherein said spherical objects within said mixture are movable in low-friction sliding and rolling contact with each other in all three dimensions;

wherein said composite mixture exhibits little memory for shape;

wherein said spherical objects are made from material selected from the group consisting of plastic, glass, metal, carbon, mineral, and quartz;

wherein said lubricant maintains lubriciousness with changes in temperature;

wherein said composite mixture has a low thermal mass and a low coefficient of heat transfer;

wherein the composite mixture flows and shears in response to a deforming pressure exerted on it, said flow and shear being accomplished by said spherical objects moving in rolling and sliding contact with each other;

wherein said composite mixture has a low shearing force threshold when rapidly sheared; and wherein said composite mixture resists separating into its constituent components over time.

17. A composite mixture as recited in claim 16 further comprising antifreeze.

* * * * *